(12) United States Patent
Gervasi

(10) Patent No.: US 6,309,581 B1
(45) Date of Patent: Oct. 30, 2001

(54) METHOD OF MAKING A THREE DIMENSIONAL OBJECT

(75) Inventor: Vito R. Gervasi, St. Francis, WI (US)

(73) Assignee: Milwaukee School of Engineering, Milwaukee, WI (US)

( * ) Notice: Subject to any disclaimer, the term of this patent is extended or adjusted under 35 U.S.C. 154(b) by 0 days.

(21) Appl. No.: 09/249,917

(22) Filed: Feb. 12, 1999

Related U.S. Application Data

(60) Provisional application No. 60/074,671, filed on Feb. 13, 1998.

(51) Int. Cl.$^7$ .......................... B29C 35/08; B29C 41/02; G06F 17/50; G06F 19/00
(52) U.S. Cl. ......................... 264/401; 264/308; 264/497; 700/119; 700/120
(58) Field of Search .................................. 264/308, 401, 264/497; 700/119, 120

(56) References Cited

U.S. PATENT DOCUMENTS

| | | |
|---|---|---|
| 4,844,144 | 7/1989 | Murphy et al. .................. 164/35 |
| 5,109,589 | 5/1992 | Cramer et al. ................. 29/527.4 |
| 5,256,340 | 10/1993 | Allison et al. .................. 264/401 |
| 5,418,112 | 5/1995 | Mirle et al. .................... 430/269 |
| 5,439,622 | 8/1995 | Pennisi et al. .................. 264/401 |
| 5,482,659 | 1/1996 | Sauerhoefer .................... 264/401 |
| 5,587,913 * | 12/1996 | Abrams et al. .................. 700/119 |
| 5,735,336 | 4/1998 | Oti ............................. 164/516 |
| 5,824,260 | 10/1998 | Sauerhoefer .................... 264/401 |

FOREIGN PATENT DOCUMENTS

| | | |
|---|---|---|
| 0 484 183 A1 | 5/1992 | (EP). |
| 0 590 597 A2 | 4/1994 | (EP). |
| 0 649 691 A1 | 4/1995 | (EP). |

OTHER PUBLICATIONS

Gervasi, V. R. and R. S. Crockett, *Composites With Gradient Properties From Solid Freeform Fabrication*, Rapid Prototyping Center, Milwaukee School of Engineering, Solid Freeform Fabrication Symposium, Aug. 10, 1998, pp. 729–735.

Fodran, Koch, and Menon, "Mechanical and Dimensional Characteristics of Fused Deposition Modeling Build Styles," Solid Freeform Fabrication Symposium, Aug. 12–14, 1996, pp. 419–442.

Hague, Richard and Phill Dickens, "Finite Element Analysis & Strain Gauging of the Stereolithography/Investment Casting System," Solid Freeform Fabrication Symposium, Aug. 12–14, 1996, pp. 523–537.

Yao, Wenlong Albert, Hermean Wong, Ming C. Leu, "Analysis of Thermal Stresses in Investment Casting with Epoxy Patterns," North American Stereolithography User's Group Conference, 1996, 13 pages.

Phidias, "Laser Photopolymerisation Models Based on Medical Imaging, a Development Improving the Accuracy of Surgery," North American Stereolithography User's Group Conference, 1996, 17 pages.

Hague, Richard and Phill Dickens, "Design of New Build Structures for the Successful Autoclaving of Stereolithography Models," International Conference on Rapid Prototyping, Aug. 1997, pp. 192–202.

"Declaration of Vito R. Gervasi", dated Nov. 4, 1999 (4 pages).

Gervasi, Vito R., Dr. Daniel A. Brandt, Steven D. Shaffer, King Lim, *TetraCast SLA Build Style*, The 7th International Conference on Rapid Prototyping, pp. 309–317 (Apr. 1, 1997).

Gervasi, Vito R., *Net Shape Composites Using SLA Tetra-Cast Patterns*, Rapid Prototyping Center, Milwaukee School of Engineering, Aug. 1997.

Klosterman, Don, Richard Chartoff, Nora Osborne, George Graves, Allen Lightman, Gyoowan Han, *Laminated Object Manufacturing (LOM) of Advanced Ceramics and Composites*, The 7th International Conference on Rapid Prototyping, 1997, pp. 43–50.

Klosterman, Don, Brian Priore, Richard Chartoff, *Laminated Object Manufacturing of Polymer Matrix Composites*, The 7th International Conference on Rapid Prototyping, 1997, pp. 283–292.

*Resin/Fiber Composite Manufacturing using Stereolithography*, Rapid Prototyping Report, vol. 2, No. 8, CAD/CAM Publishing, Inc., Aug. 1992, pp. 5–6.

Bagchi, Amit, Robert Beesley, *Multi–Layered Composites using Photolithography*, Solid Freeform Fabrication Symposium Proceedings, 1994, pp. 234–241.

Charan, R., A. Bagchi, *Fabrication of Composite Prototypes by 3D Photolithography*, The 4th International Conference on Rapid Prototyping, 1993, pp. 15–23.

Charan, R., T. Renault, A. A. Ogale, A. Bagchi, *Automated Fiber Reinforced Composite Prototypes*, The 4th International Conference on Rapid Prototyping, 1993, pp. 91–97.

Safari, A., S. C. Danforth, R. K. Panda, T. F. McNulty, F. Mohammadi, and A. Bandyopadhyay, *Fabrication of Piezoelectric Ceramics and Composites Using Rapid Prototyping Techniques*, The 7th International Conference on Rapid Prototyping, 1997, pp. 34–42.

(List continued on next page.)

Primary Examiner—Leo B. Tentoni

(57) ABSTRACT

A method for forming a three dimensional object, the method including the steps of generating a digital representation of the object, generating a digital representation of a build style lattice having a substantially uniform, conformal tetrahedron structure, overlaying the respective representations of the object and the build style, intersecting the overlaid representations to generate a digital representation of the object incorporating the build style; and fabricating the digital representation of the object incorporating the build style by solid free form fabrication.

24 Claims, 3 Drawing Sheets

Chang, Raymond, *Chemistry*, McGraw–Hill Publishing Company, 1988, p. 422.
http://www.webworqs.com/design/nomura/quick.html (Undated).
http://www.protogenic.com/MetalParts.html (Undated).
http://www.protogenic.com/Stereolith.html (Undated).
http://www.msoe.edu/rpc/sla.htm (Undated).
The Selective Laser Sintering Process Third–Generation Desk Top Manufacturing, DTM Corporation, Austin, Texas (undated).
Selective Laser Sintering: Understanding and Applying the Technology, Scott Hill, DTM Corporation, Presented to the First National Conference on Desktop Manufacturing, Cambridge, Massachusetts (1990).
Rapid Prototyping Systems, The Solider Solution for Prototyping and Manufacturing, Cubital (undated).
Preliminary Product Data, Citatool® SL XB 5170, 3D Systems Inc., P/N 18840–S03–01 Rev. A, Jun., 1993.
Cibatool® SL 5180, 3D Systems, Ciba–Geigy Corporation (undated).
SLS Model 125, DTM Corporation, Austin, Texas (undated).

Stereolithography 1993: Epoxy Resins, Improved Accuracy & Investment Casting, Dr. P. Jacobs, 3D Systems, Inc., Valencia, California (1993).
Rapid Prototyping and Manufacturing Conference 94, Apr. 26–28, 1994, Dearborn, MI New Resin Developments for Stereolithography, Epoxy Resin: Accuracy, Dimensional Stability and Mechanical Properties, Electroless Plating of SL–Parts, Dr. Adrian Schulthess, et al. Ciba–Geigy Corporation.
"Low Cost Jigs Fixtures & Gages for Limited Production", William E. Boyes, Society of Manufacturing Engineers, Chapter 10, Plastic Tool Construction, pp. 159–184 (undated).
Application Brief, "Nylon Material Properties", DTM Corporation (undated).
Article entitled "Rapid Stereolithography Molds" by Jim Tobin, Chris Schneider, Bob Pennisi and Steve Hunt, vol. 15, p. 38 of Motorola Inc. Technical Developments, published May 15, 1992.

\* cited by examiner

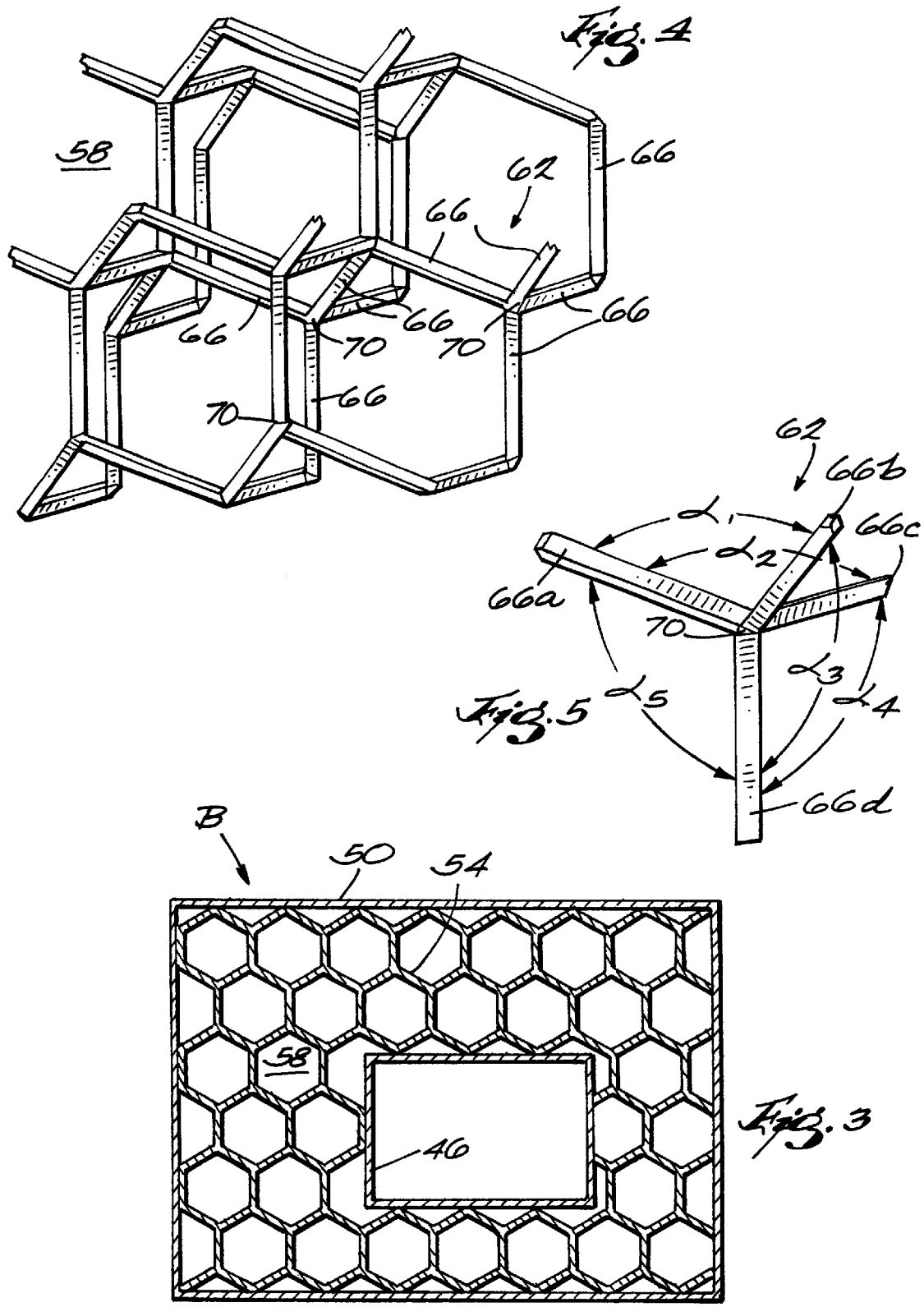

METHOD OF MAKING A THREE DIMENSIONAL OBJECT

RELATED APPLICATIONS

This application claims priority to the filing date of provisional application Ser. No. 60/074,677 filed Feb. 13, 1998.

BACKGROUND OF THE INVENTION

1. Technical Field

The invention relates to techniques for modeling three dimensional objects, and particularly to solid freeform fabrication techniques and objects made through use of such techniques.

2. Related Prior Art

Solid Freeform Fabrication ("SFF") or rapid prototyping techniques are typically useful for quickly making complex or simple three dimensional objects. In general, SFF processes enable rapid and accurate fabrication of three dimensional objects which otherwise could be produced only by lengthy molding and machining processes. SFF techniques are, generally speaking, additive processes whereby the object to be formed is fabricating by reducing a model or representation of the object's ultimate configuration into a series of planar cross-sections and subsequently recompiling the cross-sections to reconstruct the object.

Stereolithography is one of several known SFF techniques. In practicing this process using equipment commonly known as stereolithography apparatus ("SLA"), an ultraviolet laser beam selectively scans a reservoir of a of photosensitive liquid along a predetermined path. Upon the laser beam being exposed to the portions of the liquid lying in the beam's path, the exposed portions of the liquid cure or solidify through polymerization. An example of stereolithographic methods and equipment are disclosed in U.S. Pat. No. 5,256,340, which issued to Allison on Oct. 26, 1993 and which is assigned to 3D Systems, Inc.

Another known SFF process includes Cubital's Solider system. In general, this process utilizes a photo-mask which represents the image of the particular layer of the object to be produced. The mask is positioned over a layer of photosensitive liquid. Selective solidification of the layer occurs upon exposure of ultraviolet light through the mask. Unsolidified resin is drained from the partially composed object leaving the desired configuration of surfaces and cavities. The cavities of the object are then filled with a liquid material having a relatively low melting point, such as wax. Upon solidification of the wax, the uppermost layer of the object is made uniform, such as by planing or milling. Then a new layer of the photocurable liquid is positioned on the surface. Another mask is created and the process is repeated. Upon completion of production, the wax is melted and pour from the object to expose the configuration of the object. As discussed below, the object may comprise a plurality of interconnected, internal cavities or may be hollow.

In addition to these specifically described SFF techniques, there are other techniques not disturbed in detail here. Among these techniques would be plasma deposition techniques hereby plasma is deposited along a predetermined path and permitted to solidify to build an object on a layer by layer basis.

Solid Freeform Fabrication technologies depend on the use of computers to generate cross-sectional patterns representing the layers of the object being formed, and generally require the associated use of a computer and computer-aided design and manufacture (CAD/CAM) software. In general, these techniques rely on the provision of a digital representation of the object to be formed. The digital representation of the object is reduced or "sliced" to a series of cross-sectional layers which can be overlaid to form the object as a whole. The SLA or other apparatus for carrying out the fabrication of the object then utilizes the cross-sectional representations of the object for building the layers of the object by, for example, determining the path of the laser beam in an SLA or the configuration of the mask to be used to selectively expose UV light to photosensitive liquids.

In the normal practice of SFF techniques, because objects or 'parts' being fabricating are built on a layer-by-layer basis, where each layer represents a thin cross-section of the part to be formed, is it possible to build solid objects. However, fabricating "solid" parts by completely filling the cross-sectional layers of an object is relatively time consuming and consumes large computing capacities. Also, this approach limits the usefulness of the resultant object by producing an object made entirely of cured photosenstive material, rather than other materials that can be injected into the object.

In the alternative, it is also possible to form hollow structures wherein just the periphery of the object is formed. However, fabrication of hollow objects sometimes is not acceptable because of limitations in the resultant structure and the photosensitive materials used by SLA. In particular, hollow structures often suffer from high structural stresses, shrinkage, curl in the materials and other distortions of the object.

Accordingly, it is also known to form the periphery of the object by formation of a substantially intact boundary or skin, and to provide an integrally formed lattice located internally within the skin boundary. In general, stereolithography is the preferred SFF technique to be used because of its ability to rapidly and accurately fabricate objects of complex geometry with internal, interconnected cavities. An example of such a technique or "build style" is the QuickCast™ system by 3D Systems, Inc. which can be used to produce three dimensional objects having a skin and a honeycomb-like internal structure extending between the boundaries defined by the skin.

These known lattice techniques or build styles typically incorporate a construction of cross-hatching in place of completely filling the successive cross-sections. The lattice work of known build styles primarily consist of a cross-hatch pattern of solid material lying in a plane and separated by liquid photopolymer. The outer and inner edges of each layer are solidified by scanning the boundaries of the object to be formed, thus forming the skin.

The desired internal and external object geometry depends upon the anticipated usage of the object formed by the SLA and is based upon a computer generated model or representation of the object. For example, it may be desirable to produce an object with a hollow portions, solid portions and portions occupied by a lattice work. These "build styles" each have distinct advantages and disadvantages. For example, certain build styles, such as the QuickCast™ build styles can be useful when the resultant object is to be filled with a material to solidify, strengthen or otherwise further process the object. The presence of a lattice in a build style can often afford more ready introduction of strengthening materials into the object can provide dimensional stability, dimensional accuracy and functionality, or provide a more accurate model of a part being prototyped by use of the SLA.

SUMMARY OF THE INVENTION

At the same time, in some SFF applications, known build style configurations can have detrimental effect. The skin and lattice work can define internal chambers or corridors within the object that retain liquid photopolymer while the part is being created. The trapped liquid is then either drained by formation of holes in the object, either during or subsequent to the SFF process, or in a processing known as 'post-curing'. Extensive post-curing can be required when the internal cross-hatch lattice only defines discrete x-z and y-z, planes are in such cases long vertical corridors of unpolymerized material remain substantially uncured until post-processing.

Another disadvantage of known build styles formed by SFF techniques is that if secondary reinforcement materials, such as fibers, beads or powders, are introduced into an object in conjunction with a primary strengthening material, the flow paths within the object may disrupt even distribution of the secondary materials within the object. Also, if the flow paths are formed in elongated corridors or are otherwise labyrinthine, the pressures needed to inject materials into and throughout the object may be so great so as to cause distortions of the object's dimensions. Also, in build styles that are not uniform throughout the interior of the object, thermal stresses and resultant distortions can compromise the usefulness of the object as a prototype or investment cast model.

It is therefore an object of the invention to provide a method of forming an object while reducing or eliminating post-processing time for objects made by SFF techniques.

It is a further object of the invention to provide a method of reducing or eliminating distortions of such an object while increasing structural integrity of the formed part.

It is a further object of the invention to provide a method of forming a three dimensional object using a build style that provides uniform, omnidirectional flow paths, and that reduces or eliminates obstructions to the flow of strengthening materials into the object.

In one embodiment, the invention provides a three dimensional object which is formed through use of a free form fabrication technique and which includes a boundary skin and a lattice integrally formed with and extending from the skin, the lattice including a plurality of substantially uniform conformal tetrahedrons. Each tetrahedron includes four legs extending from a node. The legs have a uniform length and thickness, and extending from the node to define therebetween substantially equal included angles.

The invention also provides a method for forming a three dimensional object by the steps of generating a digital representation of the object and then generating a digital representation of a build style lattice having a substantially uniform, conformal tetrahedron structure. The method then overlays the respective representations of the object and the build style and intersects the overlaid representations to generate a digital representation of the object incorporating the build style. The next step is fabricating the digital representation of the object incorporating the build style by solid free form fabrication.

The invention also provides a three dimensional object formed through use of a free form fabrication method comprising the steps of:

A. generating a digital representation of the object including a representation of a surface of the object;

B. generating a digital representation of a build style lattice having a substantially uniform, conformal tetrahedron structure, the lattice including a plurality of substantially uniform conformal tetrahedrons, each tetrahedron including four legs extending from a node, the legs having a uniform length and thickness, the legs extending from the node to define therebetween substantially equal included angles;

C. overlaying the respective representations of the object and the build style;

D. intersecting the overlaid representations to generate a digital representation of the object incorporating the build style; and E. fabricating the digital representation of the object incorporating the build style to form a boundary skin and a lattice integrally formed with and extending from the skin.

Other features and advantages of the invention will become apparent to those skilled in the art upon review of the following detailed description, claims and drawings.

DESCRIPTION OF THE DRAWINGS

FIG. 3 is a cross-sectional view of second object embodying the invention.

FIG. 4 is an enlarged view of a portion of the object shown in FIG. 3.

FIG. 5 is an enlarged view of a portion of the object shown in FIG. 4.

Figure 2:
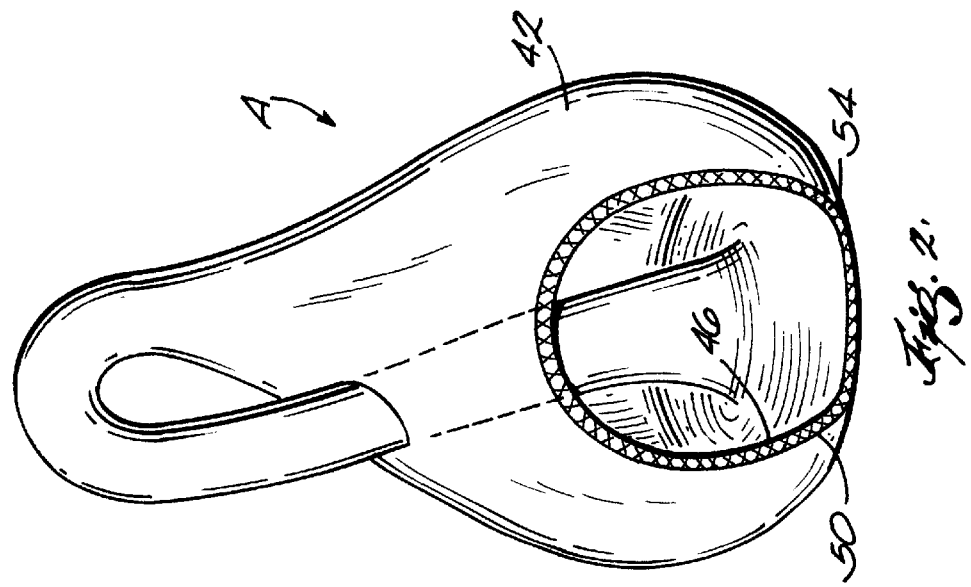
FIG. 2 is a perspective view, partially broken away for illustration, of a first object embodying the invention.

Before one embodiment of the invention is explained in detail, it is to be understood that the invention is not limited in its application to the details of construction and the arrangements of components set forth in the following description or illustrated in the drawings. The invention is capable of other embodiments and of being practiced or being carried out in various ways. Also, it is to be understood that the phraseology and terminology used herein is for the purpose of description and should not be regarded as limiting.

DETAILED DESCRIPTION OF THE PREFERRED EMBODIMENT

Figure 1:
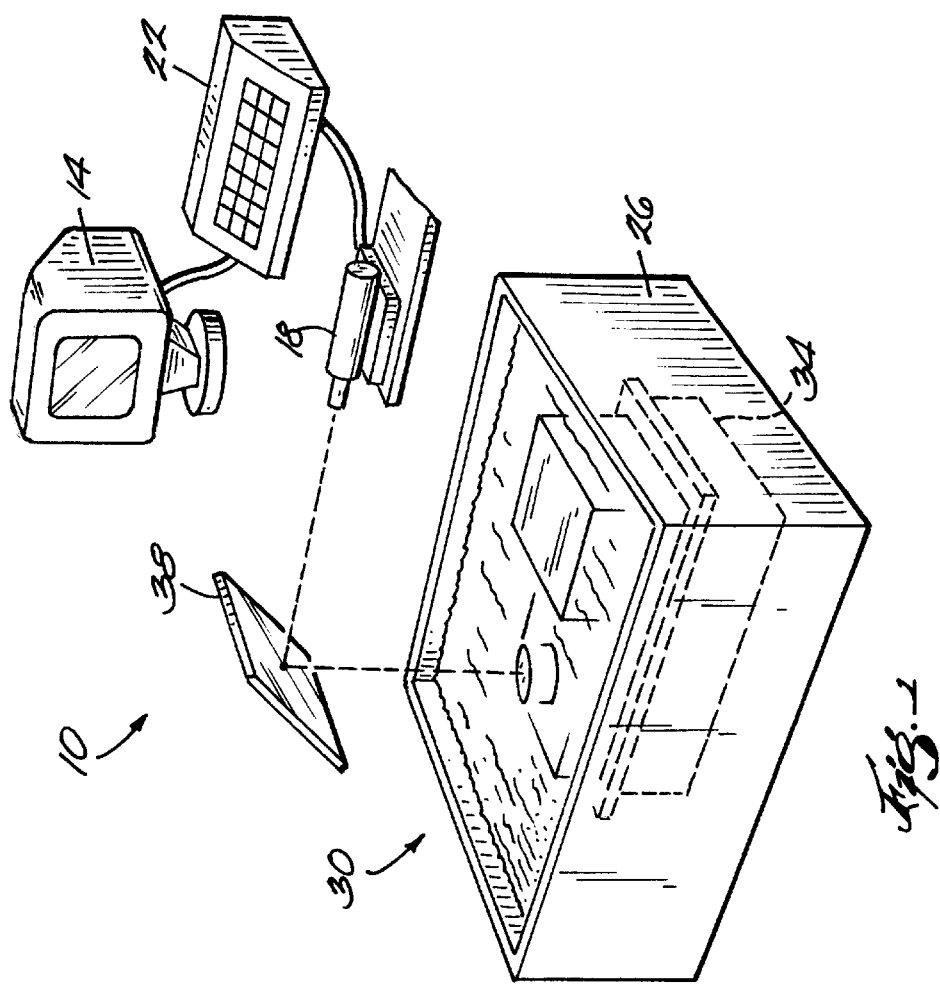
FIG. 1 illustrates stereolithography apparatus usable to practice the invention.

The drawings illustrate apparatus 10 which can be used to carry out the invention and objects embodying the invention. In particular, and with initial reference to FIG. 1, the apparatus 10 is a stereolithography apparatus ("SLA") including a computer 14, a laser beam generator 18 and a control 22 associated with the computer 14 and laser beam generator 18. The apparatus 10 also includes a tank 26 which contains a reservoir 30 of photosensitive liquid. A model support base 34 is located in the tank 26 and can be selectively indexed vertically within the reservoir 30 of liquid by means of an elevator apparatus (not shown). The apparatus 10 also includes a mirror assembly 38 supported in position relative to the laser beam generator 18 to precisely direct a beam produced by the generator 18 into the reservoir 30 of liquid. The mirror assembly 38 also can be selectively repositioned in a precise manner by a mirror control apparatus (not shown) to redirect the beam along a predetermined path along the surface of the liquid reservoir 30. Many suitable SLAs are available and can be successfully used for apparatus 10. A preferred SLA is made by 3D Systems, Inc. (Model Nos. SLA-190, SLA-250 and SLA-500). Suitable computers and software applications for use with such SLAs include workstations manufactured by Silicon Graphics (Models: Indigo R4000; INDY PC and SC; Indigo X2, R4000 and R4400) and IRIX software (Release 5.2 or higher).

A preferred photosensitive material for use in SFF fabrication of objects for prototyping and casting is an epoxy resin sold under the name Cibatool XB5170 for use with the SLA-190 and SLA-250 models and Cibatool 5180 for use with the SLA-500.

A suitable software application for operating the SLA is also provided by 3D Systems, Inc. under the Quickcast™ (QuickCast 1.1 Workstation Software).

In operation, a laser beam provided by the generator scans the surface of the reservoir 30 along a predetermined path. Upon the laser beam exposing portions of the liquid to the radiation, the exposed portions of the liquid cures or solidifies through polymerization. Initially, the support base 34 is positional immediately below the surface of the reservoir 30, and the beam's radiation polymerizes liquid resident on the base 34. The base 34 then indexes downwardly, and the beam follows the path needed to form the next highest layer of the object to be formed.

The apparatus 10 can be used to fabricate a variety of objects, such as the object A shown in FIG. 2. The object A has a complex configuration and includes a wall 42 having an inner skin 46, an outer skin 50 spaced from the inner skin, and a lattice 54 occupying the space between the inner and outer skins. Object A is fabricated using a particular build style, described below, which provides a high-strength, low-volume lattice 54. The lattice 54 is also useful in making objects such as object A by affording relatively smooth surfaces on skins 46 and 50.

The apparatus 10 also can be used to fabricate object B shown in FIG. 3. The object B has a simpler configuration then that of object A and also includes inner and outer skins 46, 50 and a lattice 54 extending between the inner and outer walls. Notably with respect to FIG. 3, the lattice 54 is relatively open, and does not segregate the interior space 58 between the skins 46, 50 into cavities or corridors. Rather, as shown in FIG. 4 and as discussed in detail below, the openness of the lattice 54 is uniform in all directions between the skins 46, 50.

The skins 46, 50 of the objects are relatively thin, but can be made as thin or thick as is desired for the particular geometry of the object and the anticipated use of the object. A typical wall thickness can be in the range of 0.010 inches to 0.55 inches.

The lattice 54 of the objects A, B is formed through SFF techniques using a build style including a plurality of uniformly configured and sized tetrahedrons 62. With reference to FIGS. 4 and 5, each tetrahedron 62 includes four legs 66a, 66b, 66c, 66d extending from a single node 70. The legs 66 are elongated and relatively thin, and are of a uniform length and cross-sectional area. While the lengths and thicknesses of the legs 66 can be modified according to the geometry and anticipated usage of the object being formed, the preferred cross-sectional area of the legs is approximately 0.0004 square inches and the length is a standard 0.130 inches. Each of the legs 66 extends from the node 70 to define therebetween substantially equal included angles a of approximately 109.5°. Thus, with reference to FIG. 5, the angles $\alpha_{1-5}$ are equal and indicate that each of the four legs 66a–d in a tetrahedron 62 are identically oriented with respect to the other three legs in the same tetrahedron.

The objects A, B can be fabricated so as to have a tetrahedron lattice 54 by use of the apparatus 10 through the following steps. First, the configuration of the object to be formed must be represented in digital form using the computer 14. Among the variety of ways a digital representation of the object can be provided is through use of the computer 14 and associated CAD/CAM software resident on the computer. A suitable CAD/CAM software application is sold under the name ProEngineer by Parametrics Technologies Corporation, and a suitable computer system to generate a digital representation of the object to be formed is sold under the name Indigo by Silicon Graphics. In the alternative, either the object itself or drawings of the object can be digitized to provide a digital representation of the object.

The next step in the fabrication method is generating a digital representation of a build style lattice having a substantially uniform, conformal tetrahedron structure 54. More particularly in this regard, and with particular reference to FIG. 4, the digital build style lattice includes a digital representation of the above described tetrahedron lattice 54. The generation of a digital representation of the lattice 54 is preferably performed through use of aforementioned ProEngineer software application in combination with software available from Materialize under the name Magics RP.

The digital representation of the lattice 54 can be generated in a variety of ways, and can incorporate legs 66 having a variety of cross-sections and configurations. In FIGS. 4 and 5, the legs have generally square cross-sections when viewed in a plane perpendicular to the leg's axis. A digital representation of this configuration can, in general, be generated by selecting a datum point which serves as the center of a node 70. A square is then generated in a single plane centered on the datum point. From the square, two legs 66 are generated along diverging axes defining an included angle of 109.5°. Next, two additional legs of the tetrahedron are formed by extending the second pair of legs from the square along respective axes which are at 109.5° to the first pair of legs.

Once the representation of a single tetrahedron is generated, additional tetrahedrons can be formed by defining a second and subsequent data points at the distal ends of the legs.

Figure 6:
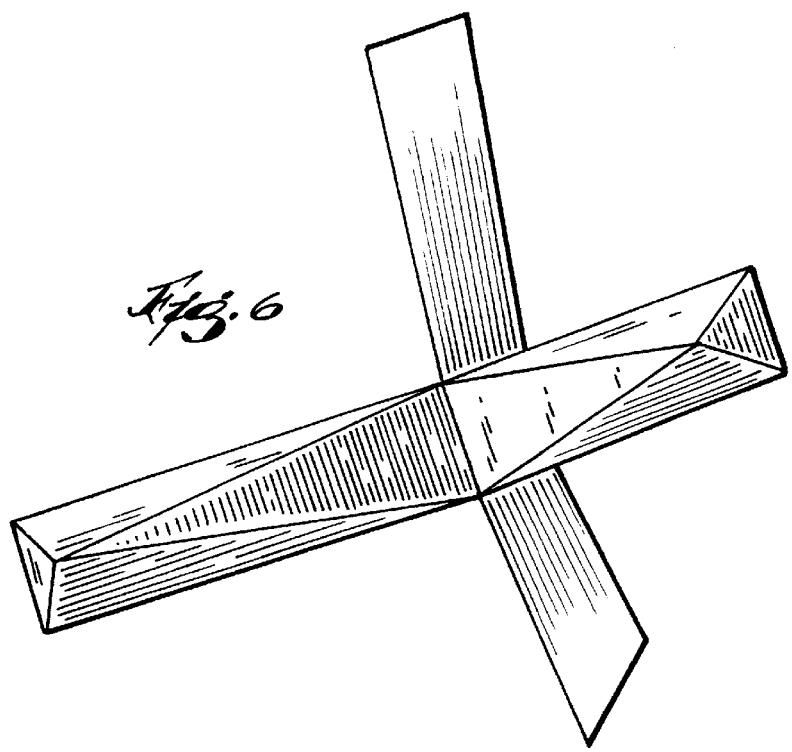
FIG. 6 is an alternative arragement of the lattice shown in FIG. 4.
Figure 7:
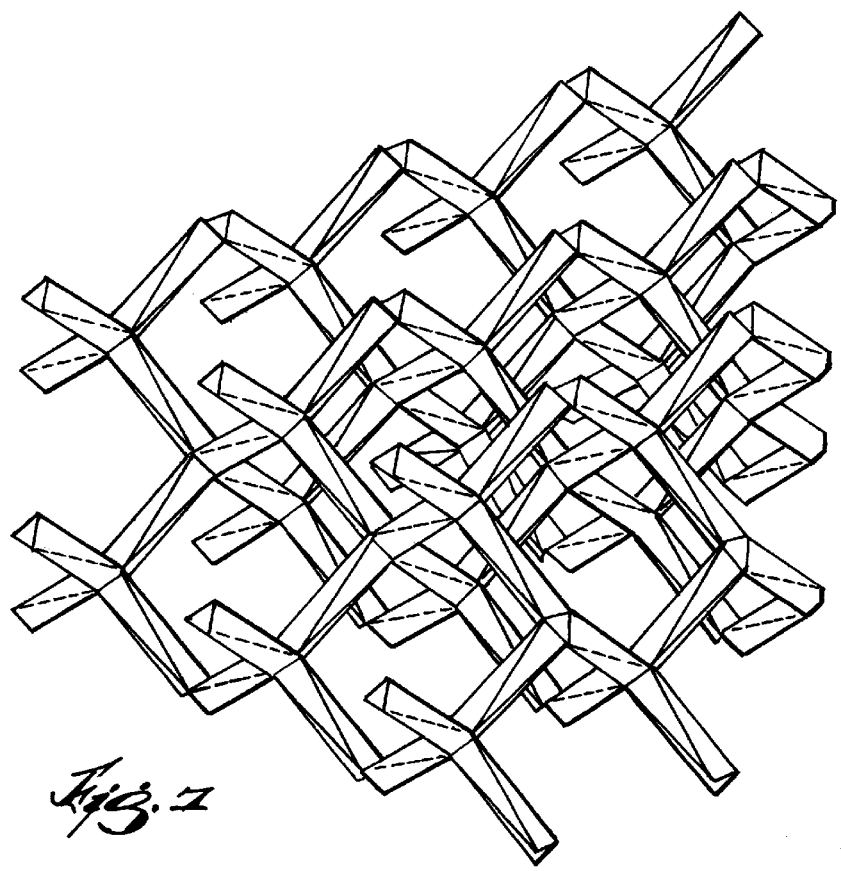
FIG. 7 is an enlarged view of a portion of FIG. 6.

In the alternative, and as illustrated in FIGS. 6 and 7, the legs 66 can also be represented by a configuration providing a cross-section that varies along the length of the leg 66. In particular, the legs 66 shown in FIGS. 6 and 7 can be represented by selecting a datum point and generating an equilateral triangle centered about the datum point. An axis normal to the plane of the triangle is generated. A second triangle, in a plane parallel to the first triangle, i.e., normal to the axis is generated. The second triangle is rotated 60° about the axis relative to the first triangle. Then the vertices or points of the first and second triangles are connected by straight lines. Each vertex of each triangle is connected with two vertices of the other triangle so that the surfaces of the legs are defined by six facets or faces which lie in respective planes and which have triangular peripheries.

The next step in the fabrication method is overlaying the respective digital representations of the object and the build style. This step of overlaying the digital representations of the lattice 54 and object is preferably performed by use of the aforementioned Magics RP software.

The next step in the fabrication method is intersecting the overlaid representations to generate a digital representation of the object incorporating the build style. The generation of a digital representation of the intersection of the representations of the lattice 54 and object is preferably performed through use of software available from 3D Systems, Inc. under the name Maestro using a double or triple border compensation with no fill.

The next step in the fabrication method is fabricating the digital representation of the object incorporating the build style by solid free form fabrication. This step is accomplished through operation of apparatus 10.

The resultant objects incorporating the build style 54 have an open cell interior structure, which provides uniform flow paths throughout the structure. This omnidirectional uniformity promotes ready drainage of uncured liquids in the object, and also permits injection of materials into the object at relatively low pressures. Also, the openness of the structure affords more uniform filling of the object.

These advantageous characteristics are achieved while at the same time maintaining a structure that has relatively high strength for the volume of the object and mass of material used, good thermal and has dimensional stability.

Various features of the invention are set forth in the following claims.

What is claimed is:

1. A method for forming a three dimensional object, said method comprising the acts of
    generating a digital representation of the object;
    generating a digital representation of a build style lattice having a substantially uniform, conformal tetrahedron structure;
    overlaying the respective representations of the object and the build style;
    intersecting the overlaid representations to generate a digital representation of the object incorporating the build style; and
    fabricating the object incorporating the build style from the digital representation of the object incorporating the build style by solid free form fabrication.

2. A method for forming a three dimensional object, said method comprising the acts of
    generating a digital representation of the object including a representation of a surface of the object;
    generating a digital representation of a build style lattice having a substantially uniform, conformal tetrahedron structure, the lattice including a plurality of substantially uniform conformal tetrahedrons, each tetrahedron including four legs extending from a node, the legs having a uniform length and thickness, the legs extending from the node to define therebetween substantially equal included angles;
    overlaying the respective representations of the object and the build style;
    intersecting the overlaid representations to generate a digital representation of the object incorporating the build style; and
    fabricating the object incorporating the build style from the digital representation to form a boundary skin and a lattice integrally formed with and extending from the skin.

3. The method of claim 1 wherein the digital representation of the object is generated using computer-aided design and manufacture software.

4. The method of claim 1 wherein the solid free form fabrication is stereo lithography.

5. The method of claim 4 wherein fabricating the object by stereolithography includes the use of an epoxy resin as a photosensitive material.

6. The method of claim 5 wherein the build style permits the drainage of uncured photosensitive liquids.

7. The method of claim 1 wherein the build style permits the introduction of materials into the object at low pressures.

8. The method of claim 1 further comprising the act of introducing strengthening material into the fabricated object.

9. The method of claim 8 further comprising the act of introducing reinforcement materials into the strengthening material.

10. The method of claim 9 wherein the build style includes undisrupted flow paths for the reinforcement materials.

11. The method of claim 1 wherein the undisrupted flow paths are uniform and omnidirectional.

12. The method of claim 1 wherein the build style increases the structural integrity of the object.

13. The method of claim 1 wherein the conformal tetrahedron structure is a lattice including a plurality of substantially uniform conformal tetrahedrons, each tetrahedron including four legs extending from a node, the legs having a uniform length and thickness, the legs extending from the node to define therebetween substantially equal included angles.

14. The method of claim 1 wherein the conformal tetrahedron structure is a lattice including a plurality of substantially uniform conformal tetrahedrons, each tetrahedron including four legs extending from a node, the cross-sectional area of the legs varying along the length of the legs.

15. The method of claim 2 wherein the digital representation of the object is generated using computer-aided design and manufacture software.

16. The method of claim 2 wherein the object is fabricated using stereolithography.

17. The method of claim 16 wherein fabricating the object using stereolithography includes the use of an epoxy resin as a photosensitive material.

18. The method of claim 17 wherein the build style permits the drainage of uncured photosensitive liquids.

19. The method of claim 2 wherein the build style permits the introduction of materials into the object at low pressures.

20. The method of claim 2 further comprising the act of introducing strengthening material into the fabricated object.

21. The method of claim 20 further comprising the act of introducing reinforcement materials into the strengthening material.

22. The method of claim 21 wherein the build style includes undisrupted flow paths for the reinforcement materials.

23. The method of claim 22 wherein the undisrupted flow paths are uniform and omnidirectional.

24. The method of claim 2 wherein the build style increases the structural integrity of the object.

* * * * *